United States Patent Office 3,440,489
Patented Apr. 22, 1969

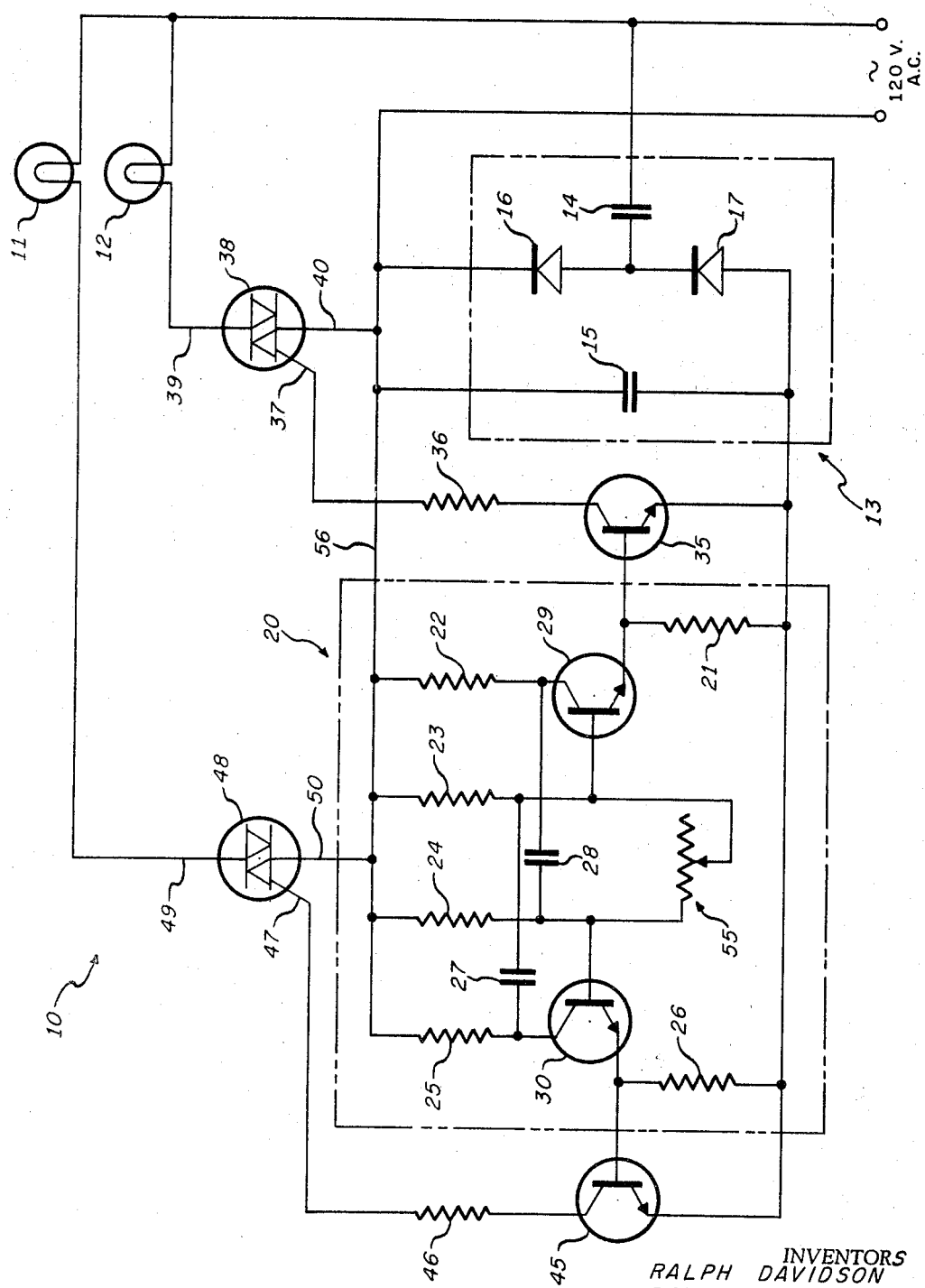

3,440,489
BIDIRECTIONAL SWITCHING MEANS FOR
ELECTRICAL LAMPS
Ralph Davidson and David R. Greenberg, Old Bethpage, N.Y., assignors to Sperry Rand Corporation, a corporation of Delaware
Filed Oct. 21, 1966, Ser. No. 588,631
Int. Cl. H05b 39/02, 41/16
U.S. Cl. 315—209  9 Claims This invention relates to lamp flashing apparatus.

Prior art lamp flashing devices have utilized electro-mechanical components such as switches, motors and cams with their numerous inherent disadvantages. Alternatively, lamp flashing devices have also utilized electronic circuits to effect the switching and oscillatory functions which require well regulated power supplies that transform the available power, usually 120-volt A.C., 60 cycle, into a relatively low D.C. voltage, for example 8-volts D.C. The prior art electronic switching circuits ordinarily present class B loads to the power supply, such that, as the lamp flashing device operates, the current required from the power supply varies. A class B load of this type usually requires a well regulated power supply that includes an iron core step-down transformer and iron core inductors for filtering, both of which are bulky, heavy and expensive.

It is an object of the present invention to provide an electronic lamp flashing apparatus adapted to be energized from available 110-volt to 120-volt A.C. power lines which does not require transformers or inductors.

It is an additional object of the present invention to provide high current lamp flashing apparatus that can be remotely controlled by inexpensive low current switching controls.

These and other objectives are accomplished by utilizing an astable multivibrator and bidirectional semiconductor switching device symmetrically disposed such that a constant load current is drawn from the power supply during all phases of operation in order that a non-critical power supply of the type suitable for class A loads is utilized in lieu of a power supply requiring transformers or inductors.

These and other objects and advantages of the present invention will become apparent by referring to the drawing which is an electrical schematic wiring diagram of a two-lamp flasher circuit incorporating the present invention.

Referring to the drawing, for purposes of example, a lamp flashing circuit 10 is discolsed which has the capability to alternately flash two-1,000 watt tungsten lamps 11 and 12, respectively.

A non-critical power supply 13 suitable for class A loads is connected to a 120-volt A.C. source indicated by the legend to provide a lower (B+) D.C. voltage to operate the astable multivibrator. The power supply 13 comprises dual capacitors 14 and 15 and dual diodes 16 and 17 arranged in the conventional manner of a class A power supply. The B+ voltage is provided to a symmetrical astable multivibrator 20 having a plurality of resistors 21, 22, 23, 24, 25 and 26, dual capacitors 27 and 28, and a pair of transistors 29 and 30 arranged in a conventional manner for cyclically providing first and second output signals in the form of square waves of opposite states with respect to each other having a frequency of oscillation for example of 55 hertz with an amplitude of 10 volts. The collector of the transistor 29 is connected to the base of a power amplifying transistor 35 which in turn has its collector connected through a current limiting resistor 36 to the gate electrode 37 of a gated silicon controlled bidirectional A.C. switch 38. One terminal 39 of the Triac 38 is connected to the lamp 12 which in turn is connected to the A.C. power source while the other terminal 40 of the Triac 38 is also connected to the A.C. power source.

In a similar manner, the collector of the transistor 30 is connected to the base of a power amplifying transistor 45 which has its emitter connected through a current resistor 46 to a gate electrode 47 of a gated silicon controlled bidirectional A.C. switch 48. The terminal 49 of the gated silicon controlled bidirectional A.C. switch 48 is connected to the lamp 11 which in turn is connected to the A.C. source. The other terminal 50 of the gated silicon controlled bidirectional A.C. switch 48 is also connected to the A.C. source.

In operation, when the transistor 29 conducts in the normal course of operation of the astable multivibrator 20, it causes the transistor 35 to conduct. The conduction of transistor 35 provides a current through the gate electrode 37 which energizes the gated silicon controlled bidirectional A.C. switch 38 causing it to conduct by virtue of the charactreistics of the gated silicon controlled bidirectional A.C. switch 38. When conducting, the gated silicon controlled bidirectional A.C. switch 38 permits A.C. current to flow through the lamp 12 thereby illuminating the lamp 12 until the transistor 29 is turned off, which time depends upon the time constant of the multivibrator 20. This in turn deenergizes the gated silicon controlled bidirectional A.C. switch 38 thereby turning off the lamp 12.

When the transistor 29 is turned off, the transistor 30 is automatically turned on due to the astatble nature of the multivibrator 20. Conduction through the transistor 30 causes the transistor 45 to conduct thereby providing a current to the gate electrode 47 of the gated silicon controlled bidirectional A.C. switch 48 which causes it to conduct. This provides a path for the A.C. current to flow from the 120-volt A.C. source through the lamp 11 thereby illuminating the lamp 11 while the lamp 12 is off. Depending upon the characteristics of the multivibrator 20, the lamps 11 and 12 are alternately illuminated to flash at a predetermined rate, for example 55 hertz.

When a variable frequency flashing rate is desired, a variable resistor 55 may be connected to have its resistive winding connected to the base of the transistor 30 while its wiper is connected to the base of the transistor 29. By varying the position of the wiper of the variable resistor 55, the frequency of the basic oscillator including the transistors 29 and 30 can be varied to provide a flashing rate, anywhere from 40 to 70 hertz, for example.

When a single flashing lamp such as 11 is required, the gated silicon controlled bidirectional A.C. switch 38 and the lamp 12 may be eliminated. In this event, the upper end of the resistor 36, as viewed in the drawing, is directly connected to the A.C. source by connecting it to the lead 56. Then, only the remaining lamp 11 will flash when the transistors 30 and 45 are conducting. On the alternate half cycles when the transistors 29 and 35 are conducting, the current is bypassed through the resistor 36 back to the A.C. source. This technique results in an identical power supply 13 balanced for low frequency ripple with the capacitor 15 required only to filter 60 hertz.

It will be appreciated that the invention provides a simple, compact, reliable lamp flasher that controls high current lamp circuits. Further, the high current lamp circuits can be remotely controlled by low current switching controls.

While the invention has been described in its preferred embodiments, it is to be understood that the words which have been used are words of description rather than limitation and that changes within the purview of the ap-

What is claimed is:
1. Lamp flashing apparatus comprising:
 (a) power supply means of the type suitable for class A loads adapted to be connected to an A.C. source for providing a D.C. voltage,
 (b) symmetrical astable multivibrator means coupled to said power supply means and responsive to said D.C. voltage for cyclically providing first and second output signals of opposite states with respect to each other,
 (c) first and second gated bidirectional switching means having first and second gating electrodes respectively, and adapted to control first and second lamp means respectively; and
 (d) first and second power amplifying means each responsive to said first and second multivibrator output signals and connected to said first and second gating electrodes respectively for controlling said switching means in accordance with a predetermined state of said output signals whereby a constant load current is drawn from said power supply during all phases of operation of said apparatus.

2. Lamp flashing apparatus of the character recited in claim 1 wherein said first and second bidirectional switching means comprise first and second gated silicon controlled bedirectional A.C. switches, respectively.

3. Lamp flashing apparatus of the character recited in claim 1 and further including variable resistor means coupled to said multivibrator means for varying the flashing rate by varying the oscillating cycle of said multivibrator means.

4. Lamp flashing apparatus of the character recited in claim 1 and further including first and second lamp means coupled respectively between said first and second bidirectional switching means and said A.C. source for flashing alternately at a predetermined rate.

5. Lamp flashing apparatus of the character recited in claim 1 and further including variable resistor means coupled to said multivibrator means for varying the flashing rate by varying the oscillating cycle of said multivibrator means, first and second lamp means coupled respectively between said first and second bidirectional switching means and said A.C. source for flashing alternately at a predetermined rate determined by said variable resistor means.

6. Lamp flashing apparatus comprising:
 (a) power supply means of the type suitable for class A loads adapted to be connected to an A.C. source for providing a D.C. voltage,
 (b) symmetrical astable multivibrator means coupled to said power supply means and responsive to said D.C. voltage for cyclically providing first and second output signals of opposite states with respect to each other,
 (c) gated bidirectional switching means having at least one gating electrode and adapted to control lamp means, and
 (d) first and second power amplifying means each responsive to said first and second multivibrator output signals and at least one connected to said gating electrode for controlling said switching means in accordance with a predetermined state of said output signals whereby a constant load current is drawn from said power supply during all phases of operation of said apparatus.

7. Lamp flashing apparatus of the character recited in claim 6 wherein said switching means comprises at least one gated silicon controlled bidirectional A.C. switch.

8. Lamp flashing apparatus of the character recited in claim 6 and further including variable resistor means coupled to said multivibrator means for varying the flashing rate by varying the oscillating cycle of said multivibrator means.

9. Lamp flashing apparatus of the character recited in claim 6 and further including at least one lamp means coupled between said switching means and said A.C. source for flashing at a predetermined rate.

References Cited
UNITED STATES PATENTS

| | | | |
|---|---|---|---|
| 2,891,195 | 6/1959 | Smyth | 315—159 |
| 2,972,706 | 2/1961 | Malm et al. | 315—200 X |
| 3,253,186 | 5/1966 | Rogers et al. | 315—209 |
| 3,263,119 | 7/1966 | Scholl | 331—113 X |
| 3,376,472 | 4/1968 | Taylor et al. | 315—209 X |

JOHN W. HUCKERT, *Primary Examiner.*

R. F. POLISSACK, *Assistant Examiner.*

U.S. Cl. X.R.

307—247, 249; 315—200; 331—113.